US008325996B2

(12) United States Patent
Martin et al.

(10) Patent No.: US 8,325,996 B2
(45) Date of Patent: Dec. 4, 2012

(54) METHOD AND DEVICE FOR LOCATING A HUMAN IRIS IN AN EYE IMAGE

(75) Inventors: Lionel Martin, Peynier (FR); Guillaume Petitjean, Aix en Provence (FR); Stéphane Derrode, Marseilles (FR); William Ketchantang, Chatous (FR)

(73) Assignees: STMicroelectronics Rousset SAS, Rousset (FR); Universite Paul Cezanne Aix Marseille III, Aix en Provence Cedex (FR)

( * ) Notice: Subject to any disclaimer, the term of this patent is extended or adjusted under 35 U.S.C. 154(b) by 1240 days.

(21) Appl. No.: 12/150,352

(22) Filed: Apr. 24, 2008

(65) Prior Publication Data

US 2008/0273763 A1 Nov. 6, 2008

(30) Foreign Application Priority Data

Apr. 26, 2007 (FR) ...................................... 07 03039
Sep. 5, 2007 (FR) ...................................... 07 06202

(51) Int. Cl.
G06K 9/00 (2006.01)
(52) U.S. Cl. ........ 382/117; 382/195; 382/204; 382/206; 713/186; 340/5.53; 340/5.83; 902/6
(58) Field of Classification Search .................. None
See application file for complete search history.

(56) References Cited

U.S. PATENT DOCUMENTS 5,016,282 A * 5/1991 Tomono et al. ............... 382/117

| 7,593,550 | B2 * | 9/2009 | Hamza | 382/117 |
|---|---|---|---|---|
| 2005/0207614 | A1 * | 9/2005 | Schonberg et al. | 382/100 |
| 2006/0147094 | A1 * | 7/2006 | Yoo | 382/117 |
| 2007/0036397 | A1 * | 2/2007 | Hamza | 382/117 |
| 2007/0071287 | A1 * | 3/2007 | Sugita et al. | 382/117 |

FOREIGN PATENT DOCUMENTS

EP 1 764 740 A1 3/2007
WO WO 2005/024708 3/2005

OTHER PUBLICATIONS

Sung, H. et al., "Iris Recognition Using Collarette Boundary Localization," Proceedings of the 17th International Conference on Cambridge, UK, Pattern Recognition, Aug. 23-26, 2004, pp. 857-860.
He, X. et al., "A Novel Iris Segmentation Method for Hand-Held Capture Device," *Advances in Biometrics Lecture Notes in Computer Science*, vol. 3832, 2005, pp. 479-485.
Lili, P. et al., "The Algorithm of Iris Image Preprocessing," *Automatic Identification Advanced Technologies*, Fourth IEEE Workshop, Oct. 17-18, 2005, pp. 134-138.

(Continued)

*Primary Examiner* — John Lee
(74) *Attorney, Agent, or Firm* — Seed IP Law Group PLLC

(57) ABSTRACT

The present disclosure relates to a method for locating the iris in an image of an eye, comprising steps of locating the pupil in the image, of detecting positions of intensity steps of pixels located on a line passing through the pupil and transition zones between the iris and the cornea, on either side of the pupil, and of determining the center and the radius of a circle passing through the detected positions of the transitions.

36 Claims, 4 Drawing Sheets

OTHER PUBLICATIONS

Yuan, W. et al., "A Rapid Iris Location Method Based on the Structure of Human Eye," Proceedings of the 2005 IEEE Engineering in Medicine and Biology 27$^{th}$ Annual Conference, Sep. 1-4, 2005, pp. 3020-3023.

Pratt, Digital Image Processing, John Wiley & Sons, New York: Wiley, 1978, p. 491.

Daugman, "High confidence personal identification by rapid video analysis of iris texture," Proceedings of the IEEE International Carnahan Conference on Security Technology, Cambridge University, 1992, pp. 50-60.

Daugman, "High confidence visual recognition of persons by a test of statistical independence," IEEE Transactions on Pattern Analysis and Machine Intelligence, 15(11):1148-1161, Nov. 1993.

Tisse et al., "Person identification technique using human iris recognition," Proc. of Vision Interface, 2002, pp. 294-299.

* cited by examiner

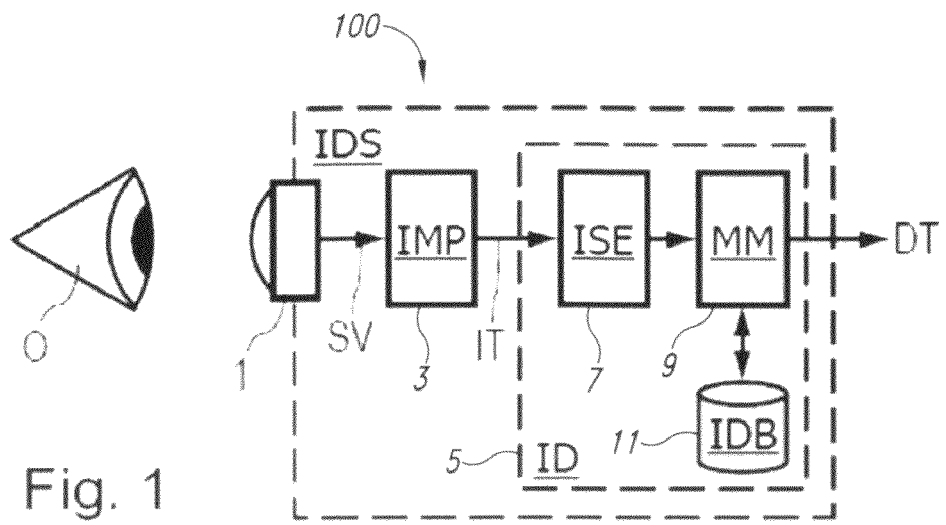
Fig. 1
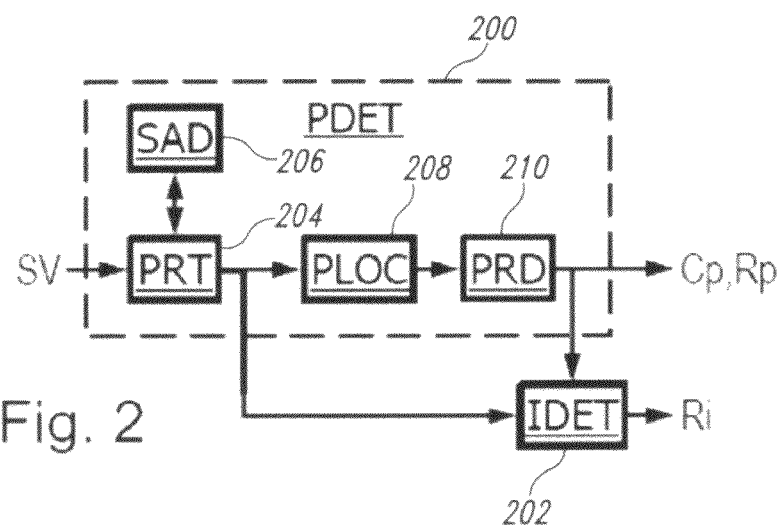
Fig. 2
Fig. 3a  Fig. 3b

METHOD AND DEVICE FOR LOCATING A
HUMAN IRIS IN AN EYE IMAGE

BACKGROUND

1. Technical Field

The present disclosure relates to the field of digital image processing, and more particularly, the processing applied to digital images of the human eye in identification or authentication applications.

2. Description of the Related Art

Iris recognition is a tested biometric identification technique, provided that the image to which the analysis and identification processing is applied is exploitable. In particular, the performance of the recognition algorithms greatly depends on the sharpness of the image of the iris to be identified. Now, in most applications, and particularly in so-called "embedded" applications (for example, for access control to a mobile telephone or laptop, for an electronic key, etc.), the camera (digital sensor and lens) used has no autofocus device adjusting the focal length according to the distance.

Moreover, to obtain a sufficient resolution of the iris, the images are taken at a relatively short distance, generally in the order of 10 to 30 cm. The result is a small sharpness zone (distance range between the camera and the eye, in which the image is sharp). This small depth of field added to the fact that the eye is spherical can cause differences in sharpness between zones of a same eye image. The user must be very cooperative by standing in a relatively small sharpness zone. Generally, the user moves so as to be positioned at a sharpness distance.

In practice, the images produced by common digital acquisition systems have the following defects:
- appearance of white spots resulting from specular reflections of light sources on obstacles existing in the acquisition environment (glasses, sensor optics, etc.),
- blurring due to minor eye movements (the pupil and the iris being always visible), and to the optical quality of the sensor,
- less sharp contours of image zones (pupil/iris, iris/cornea), due to a lack of focusing, and to the small depth of field of the optical system,
- the eyelashes cover a part of the iris.

When the images are poor, the performance of certain traditional iris identification methods can be diminished, generally as a result of errors in locating the iris.

BRIEF SUMMARY

One embodiment suggests improving the iris location, particularly to render the identification algorithms less sensitive to the quality of the images.

This object may be achieved by providing a method for locating the iris in an image of an eye, comprising a step of locating the pupil in the image.

According to one embodiment, the method comprises steps of detecting positions of intensity steps of pixels located on a line passing through the pupil and transition zones between the iris and the cornea, on either side of the pupil, and of determining the center and the radius of a circle passing through the detected positions of the transitions.

According to one embodiment, the positions of the transitions are detected by calculating the energy of high-frequency components of a Fourier spectrum obtained by a fast Fourier transform on a gate-type mobile window, applied to the intensities of the pixels located on the line.

According to one embodiment, the radius of the iris is determined by calculating the distance between the position of the center of the pupil and one of the positions on the line, of left and right transitions between the cornea and the iris.

According to one embodiment, the positions on the line of the left and right transitions between the cornea and the iris are determined by searching for two positions at which the high-frequency energy is locally maximal.

According to one embodiment, the energy E(m) of the high-frequency components is obtained using the following formula:

$$E(m) = \sum_{f \in DHF} \left| \sum_{x=1}^{\Delta x} I(x) \Pi_m(x) e^{-\frac{2\pi i f x}{\Delta x}} \right|^2$$

wherein I represents the intensity of a pixel at the position x on the line, m represents the position of the center of the gate-type mobile window $\Pi_m(x)$, and DHF represents the field of the high-frequency components.

According to one embodiment, the positions of the transitions are detected by applying a gradient filter between two successive gate-type mobile windows, to the intensities of the pixels located on the line.

According to one embodiment, the radius of the iris is determined by calculating the distance between the position of the center of the pupil and one of the positions on the line, of the left and right transitions between the cornea and the iris.

According to one embodiment, the positions on the line of the left and right transitions between the cornea and the iris are determined by searching for two positions at which the value of the gradient filter locally has an extremum.

According to one embodiment, the gradient filter is calculated in the following manner:

$$G(m) = \frac{1}{\Delta x} \sum_{x \in \Pi_m} I(x) - \frac{1}{\Delta x} \sum_{x \in \Pi_{m-1}} I(x)$$

wherein I represents the intensity of a pixel at the position x, m and m−1 represent the position of the center of the gate-type mobile windows $\Pi_m(x)$ and $\Pi_{m-1}(x)$, and $\Delta x$ represents the width of the mobile windows.

According to one embodiment, the width of the mobile windows is equal to 16 pixels and the displacement pitch of the mobile windows is set at 4 pixels.

According to one embodiment, the position of the center and the value of the radius of the iris are refined by an integrodifferential operator.

According to one embodiment, the pupil is located by segmenting the image, to delimit the contour of the pupil, followed by an estimation of the center of the pupil by calculating the geometrical center of the contour of the pupil.

According to one embodiment, the radius Rp of the pupil is obtained by the following expression:

$$Rp = \max$$

$$\text{where } w = \left(\frac{4}{\pi}\right)^{1/4} \left(\frac{\phi_2^3}{\phi_1}\right)^{1/8}$$

-continued $$\text{and } h = \left(\frac{4}{\pi}\right)^{1/4} \left(\frac{\phi_1^3}{\phi_2}\right)^{1/8}$$

$$\text{with } \phi_1 = \sum_{ROIP} (x - \hat{x})^2$$

$$\text{and } \phi_2 = \sum_{ROIP} (y - \hat{y})^2$$

x, y being the coordinates of the pixels in the search zone ROIP, and $\hat{x}$, $\hat{y}$ being the coordinates of the center of the pupil.

According to one embodiment, the value of the radius of the pupil is refined by an integrodifferential operator.

According to one embodiment, the method comprises a preprocessing step which filters the intensities of the pixels of the image to eliminate the eyelashes on the cornea and the iris, and the reflections on the pupil.

According to one embodiment, the filtering performed during the preprocessing step applies morphological closing and opening operations to the intensities of the pixels of the image.

According to one embodiment, the preprocessing step comprises applying a contrast enhancement process to the intensities of the pixels of the image.

According to one embodiment, the contrast enhancement is performed only on a zone of the image in which the pupil is assumed to be.

The present disclosure also relates to a device for locating the iris in an image of an eye, configured for locating the pupil in the image. According to one embodiment, the device is configured for detecting positions of intensity steps of pixels located on a line passing through the pupil and transition zones between the iris and the cornea, on either side of the pupil, and determining the center and the radius of a circle passing through the detected positions of the transitions.

According to one embodiment, the device is configured for detecting positions of the transitions by calculating the energy of high-frequency components of a Fourier spectrum obtained by a fast Fourier transform on a gate-type mobile window, applied to the intensities of the pixels located on the line.

According to one embodiment, the device is configured for determining the radius of the iris by calculating the distance between the position of the center of the pupil and one of the positions on the line, of left and right transitions between the cornea and the iris, corresponding to the highest high-frequency energy.

According to one embodiment, the device is configured for determining the positions on the line of the left and right transitions between the cornea and the iris by searching for two positions at which the high-frequency energy is locally maximal.

According to one embodiment, the device is configured for calculating the energy E(m) of the high-frequency components using the following formula:

$$E(m) = \sum_{f \in DHF} \left| \sum_{x=1}^{\Delta x} I(x) \Pi_m(x) e^{\frac{-2\pi i f x}{\Delta x}} \right|^2$$

wherein I represents the intensity of a pixel at the position x on the line, m represents the position of the center of the gate-type mobile window $\Pi_m(x)$, and DHF represents the field of the high-frequency components.

According to one embodiment, the device is configured for detecting the positions of the transitions by applying a gradient filter between two successive gate-type mobile windows, to the intensities of the pixels located on the line.

According to one embodiment, the device is configured for determining the radius of the iris by calculating the distance between the position of the center of the pupil on the line and one of the positions on the line, of the left and right transitions between the cornea and the iris, corresponding to the highest value of the gradient filter in absolute value.

According to one embodiment, the device is configured for determining the positions on the line of the left and right transitions between the cornea and the iris by searching for two positions at which the value of the gradient filter locally has an extremum.

According to one embodiment, the device is configured for calculating the gradient filter in the following manner:

$$G(m) = \frac{1}{\Delta x} \sum_{x \in \Pi_m} I(x) - \frac{1}{\Delta x} \sum_{x \in \Pi_{m-1}} I(x)$$

wherein I represents the intensity of a pixel at the position x, m and m−1 represent the position of the center of the gate-type mobile windows $\Pi_m(x)$ and $\Pi_{m-1}(x)$, and $\Delta x$ represents the width of the mobile windows.

According to one embodiment, the width of the mobile windows is equal to 16 pixels and the displacement pitch of the mobile windows is set at 4 pixels.

According to one embodiment, the device is configured for refining the position of the center and the value of the radius of the iris by an integrodifferential operator.

According to one embodiment, the device is configured for locating the pupil by segmenting the image, to delimit the contour of the pupil, then estimating the center of the pupil by calculating the geometrical center of the contour of the pupil.

According to one embodiment, the device is configured for calculating the radius Rp of the pupil by the following expression:

$$Rp = \max$$

$$\text{where } w = \left(\frac{4}{\pi}\right)^{1/4} \left(\frac{\phi_2^3}{\phi_1}\right)^{1/8}$$

$$\text{and } h = \left(\frac{4}{\pi}\right)^{1/4} \left(\frac{\phi_1^3}{\phi_2}\right)^{1/8}$$

$$\text{with } \phi_1 = \sum_{ROIP} (x - \hat{x})^2$$

$$\text{and } \phi_2 = \sum_{ROIP} (y - \hat{y})^2$$

x, y being the coordinates of the pixels in the search zone ROIP, and $\hat{x}$, $\hat{y}$ being the coordinates of the center of the pupil.

According to one embodiment, the device is configured for refining the value of the radius of the pupil by an integrodifferential operator.

According to one embodiment, the device is configured for preprocessing the image by filtering the intensities of the pixels of the image to eliminate the eyelashes on the cornea and the iris, and the reflections on the pupil.

According to one embodiment, the filtering is performed by applying morphological closing and opening operations to the intensities of the pixels of the image.

According to one embodiment, the preprocessing of the image is performed by applying a contrast enhancement process to the intensities of the pixels of the image.

According to one embodiment, the device is configured for enhancing the contrast of the image only in a zone of the image in which the pupil is assumed to be.

In one embodiment, a method for locating an iris in an image of an eye comprises: locating a pupil in the image; detecting positions of intensity steps of pixels located on a line passing through the pupil and transition zones between the iris and a cornea, on either side of the pupil; determining a center and a radius of a circle passing through the detected positions of the transitions; generating a signal indicative of a location of the iris in the image of the eye based on the determined center and radius of the circle; and outputting the generated signal to an iris recognition module. In one embodiment, the positions of the transitions are detected by calculating an energy level of high-frequency components of a Fourier spectrum obtained by a fast Fourier transform on a gate-type mobile window, applied to intensities of pixels located on the line. In one embodiment, a radius of the iris is determined by calculating a distance between a position of a center of the pupil and a selected one of the positions on the line of first and second transitions between the cornea and the iris. In one embodiment, the positions on the line of the first and second transitions between the cornea and the iris are determined by searching for two positions at which the high-frequency energy is locally maximal. In one embodiment, the energy E(m) of the high-frequency components is obtained using the following formula:

$$E(m) = \sum_{f \in DHF} \left| \sum_{x=1}^{\Delta x} I(x) \Pi_m(x) e^{\frac{-2\pi i f x}{\Delta x}} \right|^2$$

wherein I(x) represents an intensity of a pixel at a position x on the line, m represents a position of a center of the gate-type mobile window $\Pi_m(x)$, and DHF represents a field of the high-frequency components.

In one embodiment, the positions of the transitions are detected by applying a gradient filter between two successive gate-type mobile windows to intensities of pixels located on the line. In one embodiment, a radius of the iris is determined by calculating a distance between a position of a center of the pupil and a selected one of the positions on the line of the first and second transitions between the cornea and the iris. In one embodiment, the positions on the line of the first and second transitions between the cornea and the iris are determined by searching for two positions at which a value of the gradient filter locally has an extremum. In one embodiment, the gradient filter is calculated according to:

$$G(m) = \frac{1}{\Delta x} \sum_{x \in \Pi_m} I(x) - \frac{1}{\Delta x} \sum_{x \in \Pi_{m-1}} I(x)$$

wherein I(x) represents an intensity of a pixel at position x, m and m−1 represent a position of a center of the gate-type mobile windows $\Pi_m(x)$ and $\Pi_{m-1}(x)$, and $\Delta x$ represents a width of the mobile windows.

In one embodiment, a width of the mobile windows ($\Pi_m(x)$) is equal to 16 pixels and a displacement pitch of the mobile windows is set at 4 pixels. In one embodiment, a position of the center of the circle and a value of the radius of the circle are refined by an integrodifferential operator. In one embodiment, the pupil is located by segmenting the image, to delimit a contour of the pupil, followed by an estimation of a center of the pupil by calculating the geometrical center of the contour of the pupil. In one embodiment, a radius of the pupil is obtained as follows:

$$Rp = \max(w, h)$$

$$\text{where } w = \left(\frac{4}{\pi}\right)^{1/4} \left(\frac{\phi_2^3}{\phi_1}\right)^{1/8}$$

$$\text{and } h = \left(\frac{4}{\pi}\right)^{1/4} \left(\frac{\phi_1^3}{\phi_2}\right)^{1/8}$$

$$\text{with } \phi_1 = \sum_{ROIP} (x - \hat{x})^2$$

$$\text{and } \phi_2 = \sum_{ROIP} (y - \hat{y})^2$$

x, y being coordinates of pixels in a search zone ROIP, and $\hat{x}$, $\hat{y}$ being coordinates of the center of the pupil.

In one embodiment, the radius of the pupil is refined by an integrodifferential operator. In one embodiment, the method further comprises a preprocessing step of filtering intensities of pixels of the image to eliminate eyelashes on the cornea and the iris, and reflections on the pupil. In one embodiment, the filtering performed during the preprocessing step applies morphological closing and opening operations to the intensities of the pixels of the image. In one embodiment, the preprocessing step comprises applying a contrast enhancement process to the intensities of the pixels of the image. In one embodiment, contrast enhancement is performed only on a zone of the image in which the pupil is assumed to be.

In one embodiment, a device to locate an iris in an image of an eye, configured for locating a pupil in the image, comprises: means for detecting positions of intensity steps of pixels located on a line passing through the pupil and transition zones between the iris and a cornea, on either side of the pupil; means for determining a center and radius of a circle passing through the detected positions of the transitions; and means for outputting a signal indicative of the determined center and radius. In one embodiment, the means for detecting positions of the transitions is configured to determine an energy level of high-frequency components of a Fourier spectrum obtained by a fast Fourier transform on a gate-type mobile window, applied to intensities of the pixels located on the line. In one embodiment, the means for determining the center and radius is configured to determine the radius by calculating a distance between a position of a center of the pupil and one of the detected positions on the line of first and second transitions between the cornea and the iris, corresponding to a highest high-frequency energy. In one embodiment, the means for determining the center and the radius is configured to determine the positions on the line of the first and second transitions between the cornea and the iris by searching for two positions at which the high-frequency energy is locally maximal. In one embodiment, the means for determining the center and radius is configured to determine the energy of the high-frequency components according to:

$$E(m) = \sum_{f \in DHF} \left| \sum_{x=1}^{\Delta x} I(x) \Pi_m(x) e^{-\frac{2\pi i f x}{\Delta x}} \right|^2$$

wherein I(x) represents an intensity of a pixel at a position x on the line, m represents a position of a center of the gate-type mobile window $\Pi_m(x)$, and DHF represents a field of the high-frequency components.

In one embodiment, the positions of the transitions are detected by applying a gradient filter between two successive gate-type mobile windows to the intensities of the pixels located on the line. In one embodiment, the means for determining the center and the radius is configured to determine the radius by calculating a distance between a position of a center of the pupil on the line and one of the positions on the line of the first and second transitions between the cornea and the iris corresponding to a highest value of the gradient filter in absolute value. In one embodiment, the positions on the line of the first and second transitions between the cornea and the iris are determined by searching for two positions at which a value of the gradient filter locally has an extremum. In one embodiment, the gradient filter is applied in the following manner:

$$G(m) = \frac{1}{\Delta x} \sum_{x \in \Pi_m} I(x) - \frac{1}{\Delta x} \sum_{x \in \Pi_{m-1}} I(x)$$

wherein I(x) represents the intensity of a pixel at the position x, m and m−1 represent a position of a center of the respective gate-type mobile windows $\Pi_m(x)$ and $\Pi_{m-1}(x)$, and $\Delta x$ represents a width of the mobile windows.

In one embodiment, a width of the mobile windows is equal to 16 pixels and a displacement pitch of the mobile windows is set at 4 pixels. In one embodiment, the device further comprises means for refining the position of the center and the radius of the iris by an integrodifferential operator. In one embodiment, the device further comprises means for locating the pupil by segmenting the image to delimit a contour of the pupil, then estimating a center of the pupil by calculating a geometrical center of the contour of the pupil. In one embodiment, the device further comprises means for calculating a radius of the pupil by the following expression:

$$Rp = \max(w, h)$$

where $$w = \left(\frac{4}{\pi}\right)^{1/4} \left(\frac{\phi_2^3}{\phi_1}\right)^{1/8} \text{ and } h = \left(\frac{4}{\pi}\right)^{1/4} \left(\frac{\phi_1^3}{\phi_2}\right)^{1/8}$$

with $\phi_1 = \sum_{ROIP} (x - \hat{x})^2$ and $\phi_2 = \sum_{ROIP} (y - \hat{y})^2$ x, y being coordinates of pixels in a search zone ROIP, and $\hat{x}$, $\hat{y}$ being coordinates of the center of the pupil.

In one embodiment, the device further comprises means for refining the radius of the pupil by an integrodifferential operator. In one embodiment, the device further comprises means for preprocessing the image by filtering intensities of pixels of the image to eliminate eyelashes on the cornea and the iris, and reflections on the pupil. In one embodiment, the filtering is performed by applying morphological closing and opening operations to intensities of the pixels of the image. In one embodiment, the preprocessing of the image is performed by applying a contrast enhancement process to intensities of the pixels of the image. In one embodiment, the device further comprises means for enhancing a contrast of the image only in a zone of the image in which the pupil is assumed to be.

In one embodiment, a system to process a digital image of an eye comprises: a pupil location module configured to locate a pupil in the digital image; and an iris location module configured to locate in the digital image transitions between an iris and a cornea based on intensities of pixels on a curve passing through a center of the pupil. In one embodiment, the curve is a straight line passing through the center of the pupil. In one embodiment, the iris location module is configured to determine positions of the transitions based on energy levels of high-frequency components of a Fourier spectrum obtained by a fast Fourier transform on a gate-type mobile window, applied to intensities of pixels located on the curve. In one embodiment, the iris location module is configured to determine a radius of the iris based on a distance between a position of a center of the pupil and a selected one of the positions on the curve of first and second transitions between the cornea and the iris. In one embodiment, the iris location module is configured to apply a gradient filter between two successive gate-type mobile windows to intensities of pixels located on the curve. In one embodiment, the system further comprises a preprocessing module configured to filter intensities of pixels of the image to eliminate eyelashes on the cornea and the iris, and reflections on the pupil.

BRIEF DESCRIPTION OF THE SEVERAL VIEWS OF THE DRAWINGS

Examples of embodiments will be described below in relation with, but not limited to, the following figures, in which:

FIG. 1 represents in block form an iris recognition system,

FIG. 2 represents in block form modules of the iris recognition system, according to one embodiment, FIGS. 3a and 3b are images showing a preprocessing performed by a module represented in FIG. 2.

DETAILED DESCRIPTION

Figure 4:
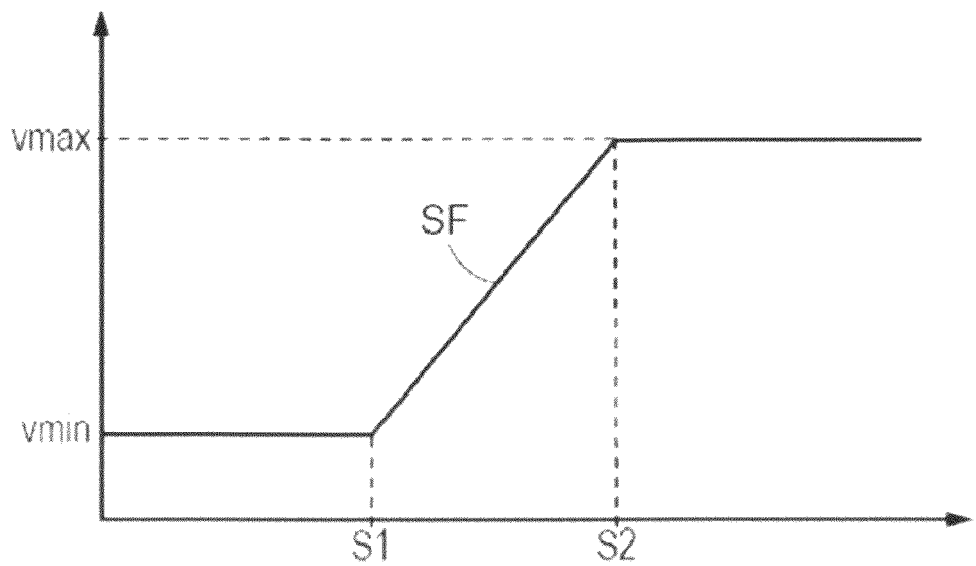
FIG. 4 represents a contrast enhancement curve used by the preprocessing module.

FIG. 1 represents an iris recognition system IDS 100. The IDS system 100 is designed to use eye images for identification or authentication by iris recognition. For this purpose, the IDS system 100 comprises a digital image sensor 1, an image selection module IMP 3, and an iris recognition module or device ID 5. The image sensor 1 acquires a sequence of video frames or of digital images SV of a user's eye O. The image selection module IMP 3 analyses each frame or image in the image sequence SV in real time and selects images IT in the sequence SV of sufficient quality to locate the iris and identify the user.

The iris recognition module ID 5 uses the selected images IT to recognize the iris images. The module ID 5 classically comprises an iris signature extraction module ISE 7, and a comparison module MM 9 connected to an iris signature database IDB 11. The extraction module ISE 7 extracts an iris signature from the images selected by the module IMP 3. The comparison module MM 9 searches to find out whether the iris signature supplied by the module ISE 7 is in the database IDB 11. The module MM 9 supplies a detection signal DT indicating whether or not the user's iris has been recognized.

For the sake of clarity, only the modules or steps useful to understand the present disclosure have been represented in the figures and will be subsequently described. In particular, the iris signature calculation operations performed by the module ISE 7 and the iris recognition processing operations performed by the module MM 9 have not been detailed. Generally speaking, the iris extraction method according to the present invention is compatible with any use of iris images. Similarly, the mode used to obtain the images to be processed by the method according to the present disclosure has not been detailed, the present disclosure again being compatible with any digital eye image, in gray level or in color.

Furthermore, in the description below, intensity of a pixel will mean the gray level or the luminance of the pixel.

FIG. 2 represents an embodiment of modules for locating the contours of the pupil PDET and of the iris IDET. The pupil location module PDET 200 is part of the image selection module IMP (See IMP 3 in FIG. 1). The iris location module IDET 202 supplies the iris signature extraction module ISE (See ISE 7 in FIG. 1) with the center and the radiuses of the internal (radius of the pupil) and external contours of the iris in the images selected IT in the sequence SV.

The module PDET 200 comprises a preprocessing module PRT 204, a module for delimiting a search zone of the pupil SAD 206, a pupil location module PLOC 208, and a refining module PRD 210 for refining the value of the radius Rp of the pupil.

The module PRT 204 applies a preprocessing operation to the images for improving the detection of the pupil. Such an operation is for example described in patent application EP 1 764 740. This preprocessing first of all comprises a filtering step enabling undesirable phenomena generally producing location errors to be removed.

The filtering step comprises applying morphological closing and opening operations to the image. The morphological closing operation $\phi 1$ is performed by a structuring element having the shape of a disc the radius of which in number of pixels corresponds approximately to the length of an eyelash in the image. In a 320×240-pixel image, this radius is for example in the order of 10 pixels. The effect of this operation is to eliminate the fine details (smaller in size than the structuring element) of the image such as the eyelashes, to smooth the contours of the zones that are larger than the structuring element, and to connect certain zones.

The morphological opening operation $\gamma 1$ is performed by a second structuring element in the shape of a disc the size of which corresponds substantially to that of the white spots of the light reflections on the eye in the image. This disc has a radius ranging between two and five times that of the disc used by the morphological closing operation. Thus, in a 320×240-pixel image, this radius is for example in the order of 20 pixels. The effect of the morphological opening operation is to at least partly eliminate the white spots and to smooth the contours, but it preserves the dark areas.

The filtering M thus performed can be modeled by the following formula:

$$M = \gamma 1 \cdot \phi 1 \quad (1)$$

FIG. 3a represents an image of an eye supplied by camera 1. FIG. 3b represents the same image after having undergone the filtering M. It can be seen in FIG. 3b that the white spots present in the image in FIG. 3a have disappeared. The same is true of the eyelashes which partly covered the iris. However, it shall be noted that this filtering has reduced the contrast between the different regions of the image containing contiguous pixels of similar intensities, i.e., particularly the iris IR, the cornea CR and the pupil P. The filtering has also decreased the circularity of the regions of the iris and of the pupil. The decrease in the contrast can be significant if the average intensity of the original images is low. Insufficient contrast causes errors in locating the pupil and the iris.

A step of enhancing the contrast of the image can however be performed. To limit the duration of this operation, the enhancement of the contrast may be carried out solely in the region of the iris IR and of the pupil P. For this purpose, the module PRT 204 uses the module SAD 206 to delimit a search zone ROIP of the pupil in the image.

The module SAD 206 delimits the search zone ROIP by comparing the intensity of each pixel in the low intensity region of the image with a threshold. It then calculates the geometrical center and the standard deviations of this region. To check the presence of the pupil P (dark region) in the image, the contrast of the search zone ROIP is determined. If the contrast is high, the pupil is then assumed to be in the search zone, otherwise, the pupil is considered to be lost and the image will not be selected to perform any iris recognition.

The contrast C of a zone of the image can be obtained by the following formula:

$$C = \frac{Imax - Imin}{Imax + Imin} \quad (2)$$

wherein Imax and Imin are the maximum and minimum intensities in the search zone ROIP of the preprocessed image. The module SAD 206 compares the contrast C with a threshold and if it is greater than the threshold, it considers that the pupil is in the search zone ROIP.

In the case of an image sequence, the module SAD 206 searches for the pupil (black region) in a first image of the sequence SV, delimits the search zone ROIP where the pupil P is assumed to be, and estimates the position of the zone ROIP in each image of the sequence according to one or more previous images.

There are several image contrast enhancement methods. However, the aim is always to decrease the low intensities and to increase the highest intensities, while keeping the initial shapes of the regions of the image.

FIG. 4 represents an example of a curve giving the corrected intensity of a pixel after contrast enhancement according to the intensity of the pixel in the image to be processed. Between 0 and an intensity threshold value s1 of a pixel in the image to be processed, the corrected intensity of the pixel is set at a minimum value vmin, (for example equal to 20 for 256 gray levels). Between the value s1 and an intensity threshold value s2, the corrected intensity of the pixel varies between the minimum value vmin and a maximum value of intensity vmax, (for example set at 200 for 256 grey levels). The zone of the curve between the threshold values s1 and s2 determines a contrast linear stretching function. Above the value s2, the corrected intensity of the pixel is set at the maximum value vmax.

The threshold values s1 and s2 can be adaptively determined according to the intensity of the pixels of the image, as follows:

$$s1 = Imoy - 2\sigma \quad (3)$$

with:

$$Imoy = \frac{1}{N}\sum_{i=1}^{N} Ii \quad (4)$$

$$\sigma = \frac{1}{\sqrt{N}}\sqrt{\sum_{i=1}^{N}(Ii - Imoy)^2} \quad (5)$$

Ii being the intensity of the pixel i in the search zone ROIP, $\sigma$ being the standard deviation of the intensities of the pixels in the zone ROIP, and N being the number of pixels in the zone ROIP.

Figure 5A:
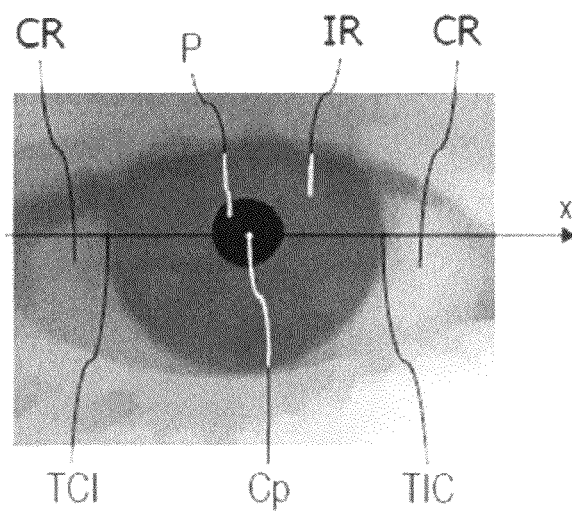
FIGS. 5a and 5b are images showing a method for locating the contour of the iris, according to an embodiment.

FIG. 5a represents an image supplied by the preprocessing module PRT 204.

The images preprocessed by the preprocessing module PRT 204 are supplied to the module PLOC 208. The module PLOC 208 implements a method for locating the pupil. The method for locating the pupil P may use integrodifferential operators enabling the center $Cp(\hat{x}, \hat{y})$ of estimated coordinates $\hat{x}, \hat{y}$, and the radius Rp of the pupil P to be estimated. For more information about these operators, refer to the documents: "High confidence visual recognition of persons by a test of statistical independence", J. G. Daugman, IEEE Transactions on Pattern Analysis and Machine Intelligence, Vol. 15, No. 11, p. 1148-1161, 1993, and "High confidence personal identification by rapid video analysis of iris texture", J. Daugman, IEEE Conf. Publication, No. 408, European convention on security and detection, 16-18 May 1995.

The integrodifferential operators perform well when the images are of good quality (very few light reflections in the image, strong contrast between the pupil and the iris). In the opposite case, the rate of good location decreases. In addition, the algorithmic complexity of these operators increases with the size of the image. To reduce the calculation time of the integrodifferential operator, the module PLOC 208 can use the Hough transform broken down according to the gradients (GHT), combined with the integrodifferential operator. The transform GHT enables the position of the center of the pupil to be rapidly estimated, while the integrodifferential operator enables the position of the center $Cp(\hat{x}, \hat{y})$ and the radius Rp of the pupil in the vicinity of the center estimated by the GHT to be refined. For more information about this method for locating the pupil, refer to the document: "Person identification technique using human iris recognition", C. L. TISSE, L. MARTIN, L. TORRES, M. ROBERT, The 15th International Conference on Vision Interface, S6.1, p. 294-300, May 27-29, 2002, Calgary, Canada 2002.

The method using the transform GHT to locate the pupil is faster than the method based on an integrodifferential operator (less algorithmic complexity) and performs well with a good quality image (few light reflections, little presence of eyelashes, black region in the vicinity of the pupil, strong contrast between the pupil and the iris, etc.). In the opposite case, the performances decrease.

Figure 5B:
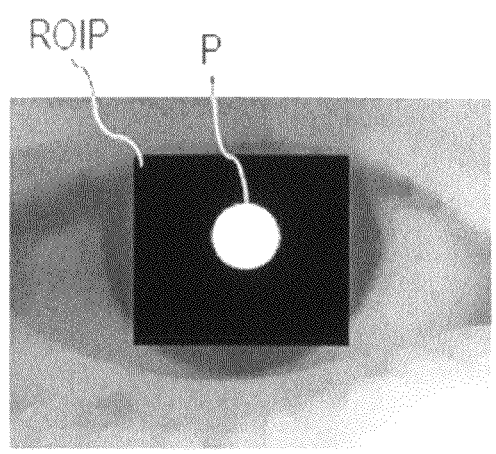

So as to efficiently locate the pupil P irrespective of the quality of the images, with a short processing time, the module PLOC 208 according to one embodiment implements a location model based on the segmentation of the pupil P in the search zone ROIP. For this purpose, all the pixels in the zone ROIP of the preprocessed image (filtering+contrast enhancement) which have an intensity equal to s1 are considered to belong to the pupil, and the other pixels are considered not to belong to the pupil. The segmented image S can thus be obtained by allocating the maximum value 255 (white) to the pixels of the pupil and 0 (black) to the other pixels of the zone ROIP. FIG. 5b is an image showing the result of the segmentation thus performed.

After segmenting the pupil P in the search zone ROIP, the module PLOC 208 estimates the value of the center $Cp(\hat{x}, \hat{y})$ of the pupil by calculating the geometrical center of the pixels (white) of the pupil in the image. The radius of the pupil Rp is then obtained from the following expression:

$$Rp = \max(w, h) \quad (6)$$

where $$w = \left(\frac{4}{\pi}\right)^{1/4}\left(\frac{\phi_2^3}{\phi_1}\right)^{1/8} \text{ and } h = \left(\frac{4}{\pi}\right)^{1/4}\left(\frac{\phi_1^3}{\phi_2}\right)^{1/8}$$

$$\text{with } \phi_1 = \sum_{ROIP}(x - \hat{x})^2 \text{ and } \phi_2 = \sum_{ROIP}(y - \hat{y})^2$$

(x,y) being the coordinates of the pixels in the search zone ROIP.

To refine the value of the radius Rp of the pupil P, the refining module PRD 210 can apply the integrodifferential operator to the preprocessed image in the vicinity of the coordinates $(\hat{x}, \hat{y})$ of the center Cp and of the radius Rp of the pupil, estimated previously. The integrodifferential operator can be defined by the following expression:

$$(Rp, \hat{x}, \hat{y}) = \max_{r \in [Rp-3, Rp+3]}\left\{\sum_{\theta=0}^{\theta=2\pi}\left(\frac{I(\hat{x} + r\cos(\theta), \hat{y} + r\sin(\theta))}{2\pi r} - \frac{I(\hat{x} + (r-1)\cos(\theta), \hat{y} + (r-1)\sin(\theta))}{2\pi(r-1)}\right)\right\} \quad (7)$$

I(x,y) representing the intensity of the pixel of coordinates (x,y).

To simplify the image processing operations performed by the selection module IMP 3, a spatial sub-sampling process can be applied to the images in the image sequence SV before they are processed by the preprocessing module PRT 204. The sub-sampling process includes reducing the resolution of the images by a factor for example equal to 2, to go from 640×480-pixel images to 320×240-pixel images. This sub-sampling process hardly affects the performance of the location method according to an embodiment.

Once the inner limit of the iris IR has been located (by the center Cp and radius Rp of the pupil P), the module IDET 202 locates the external limit of the iris, assumed to be circular, centered in the vicinity of the center Cp of the pupil. Therefore, the location performed by the module IDET 202 comprises determining the center Ci and the radius Ri of the external contour of the iris.

To determine the external radius Ri of the iris IR, the module IDET 202 can, in the same way as for the pupil, use the integrodifferential operator. The integrodifferential operator is then applied to a small grid (for example about 5×5 pixels) centered on the center $Cp(\hat{x}, \hat{y})$ of the pupil P previously estimated (which is assumed to be in the vicinity of the center Ci of the iris) and assuming that the radius of the pupil is situated in a range of values between 2 and 4 times the radius of the pupil. However, this operator does not enable the radius Ri of the iris to be estimated very precisely and this precision decreases when the contrast between the iris IR and the cornea CR is low. Furthermore, the algorithmic complexity of the integrodifferential operator increases with the width of the range of values estimated for the radius.

According to one embodiment, both of these problems are overcome by a rapid method for estimating the radius Ri of the iris IR. This method is based on locating the transitions between the iris IR and the cornea CR on either side of the pupil P. Thus, to locate the external contour of the iris, the module IDET 202 is based on the use of an intensity profile of the pixels located on a horizontal axis (Cp,x) passing through the center Cp of the pupil P on the image preprocessed by the module PRT 204. FIG. 5a represents the axis (Cp,x), the ordinate y of the pixels of this axis being set at the estimated ordinate $\hat{y}$ of the center Cp of the pupil. Generally speaking, the axis (Cp,x) is chosen so as to pass through the transition zones between the iris IR and the cornea CR on either side of the pupil.

Figure 6:
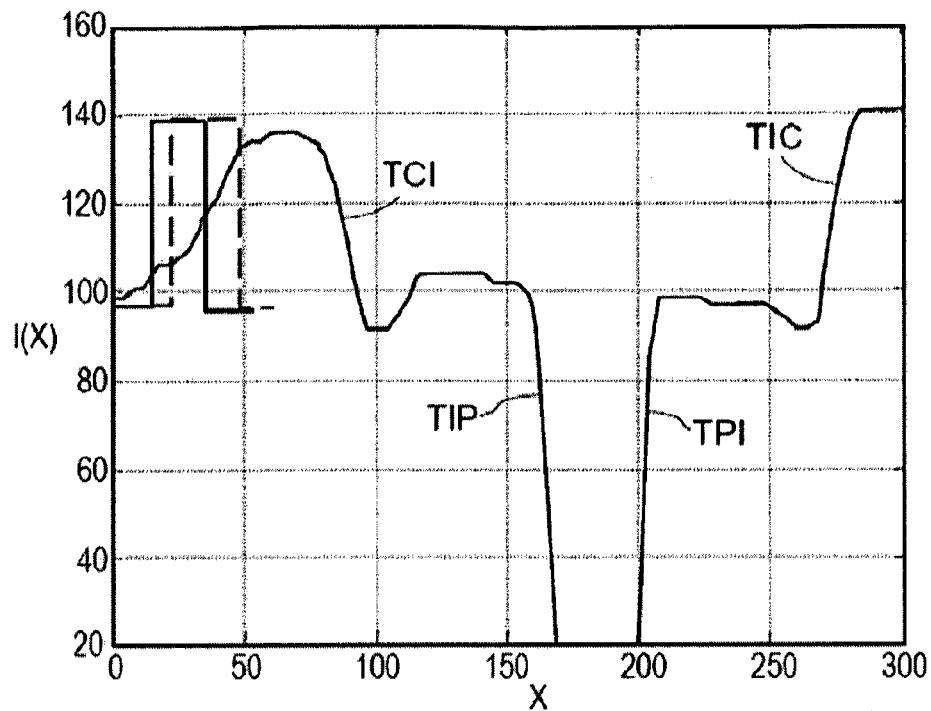
FIG. 6 represents an intensity variation curve of pixels of the image along an axis passing through the pupil.

FIG. 6 represents an example of intensity profile I(x) on the axis (Cp,x). The intensity profile comprises steep slope zones corresponding to the left transitions between the cornea and the iris TCI and between the iris and the pupil TIP, and to the right transitions between the pupil and the iris TPI and between the iris and the cornea TIC.

Figure 7:
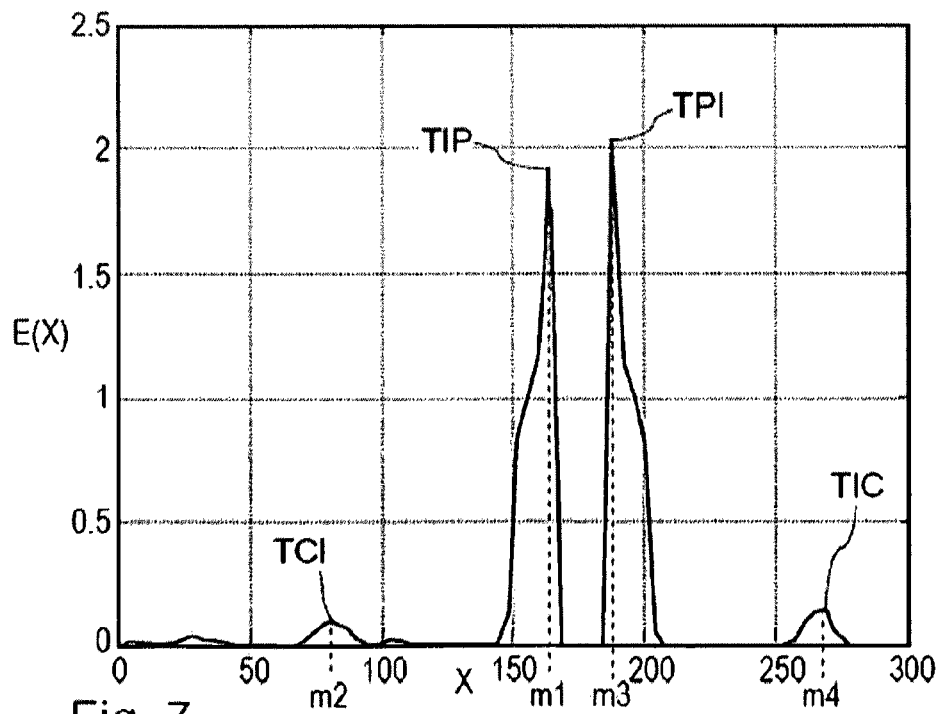
FIG. 7 represents an energy variation curve of high-frequency components of the Fourier spectrum of the curve in FIG. 6.

According to one embodiment, the transitions TCI, TIP, TPI, TIC are located by applying to the intensity profile I(x) the fast Fourier transform (SFFT: Shifted Fast Fourier Transform) on a gate-type window $\Pi_m(x)$ of mobile center m, width Δx, for example equal to 16 pixels, and the evolution pitch of which is set for example at 4 pixels. Then, the energy E(m) of the high-frequency components of the resulting Fourier spectrum is calculated using the following formula:

$$E(m) = \sum_{f \in DHF} \left| \sum_{x=1}^{\Delta x} I(x)\Pi_m(x) e^{-\frac{2\pi i f x}{\Delta x}} \right|^2 \quad (8)$$

wherein DHF represents the field of the high-frequency components [0, ..., Δf/4], Δf being for example equal to 16. In this example, the field of the high-frequency components considered corresponds to the upper quarter of the Fourier spectrum, i.e., to the four highest values. FIG. 7 represents an energy variation curve of the high-frequency components E(m) of the pixels along the axis (Cp,x).

The left transition between the iris and the pupil TIP is detected in a position m1 on the axis (Cp,x) where the high-frequency energy E(m) is maximal (central peak E(m1)). The left transition between the cornea and the iris TCI corresponds to a position m2 where a second energy peak E(m2) can be observed (other local maximum). The same reasoning is applied to locate positions m3 and m4 corresponding to the right transitions between the pupil and the iris TIP and between the iris and the cornea TIC. Energy peaks E(m3), E(m4) corresponding to the right transitions TPI and TIC can be observed at the positions m3 and m4. The positions m2 and m4 on the axis (Cp,x) of the transitions between the iris and the cornea TCI, TIC are those which are respectively the furthest to the right and the furthest to the left out of the four positions m1-m4 on the axis (Cp,x), or those which correspond to the two lowest energy peaks out of the four peaks observed E(m1), E(m2), E(m3), E(m4).

The approximate radius of the iris Ri is obtained using the following expression:

$$Ri1 = |\hat{x} - m4|, Ri2 = |\hat{x} - m2| \quad (9)$$

If Ri1≈Ri2 then
  If E(m4)>E(m2) then Ri=Ri1
  or otherwise Ri=Ri2
or otherwise
  If E(m4)<E(m2), then Ri=Ri1
  or otherwise Ri=Ri2

$\hat{x}$ being the position on the axis (Cp,x) of the center Cp of the pupil. In other words, the radius of the iris Ri is chosen equal to the distance Ri1 or Ri2 in number of pixels between the position $\hat{x}$ of the center Cp of the pupil on the axis (Cp,x) and the position m2 or m4 corresponding to the highest energy peak E(m2), E(m4) of the transitions TCI, TIC if the distances Ri1 and Ri2 are similar. In the opposite case, the value of the radius Ri is calculated with the position m2 or m4 corresponding to the lowest energy peak E(m2), E(m4).

According to another embodiment, the transitions TCI, TIC between the iris and the cornea along the axis (Cp,x) passing through the center of the pupil Cp are located by applying a so-called "gradient filtering" method.

The gradient filtering method comprises applying a gradient filter G(m) between two successive gate-type mobile windows $\Pi_{m-1}(x)$, $\Pi_m(x)$ of centers m−1, m, spaced apart by a pitch of evolution set for example at 4 pixels, each gate $\Pi_m(x)$ having a width Δx for example equal to 16. The gradient filter G(m) can be expressed in the following manner:

$$G(m) = \frac{1}{\Delta x} \sum_{x \in \Pi_m} I(x) - \frac{1}{\Delta x} \sum_{x \in \Pi_{m-1}} I(x) \quad (10)$$

Figure 8:
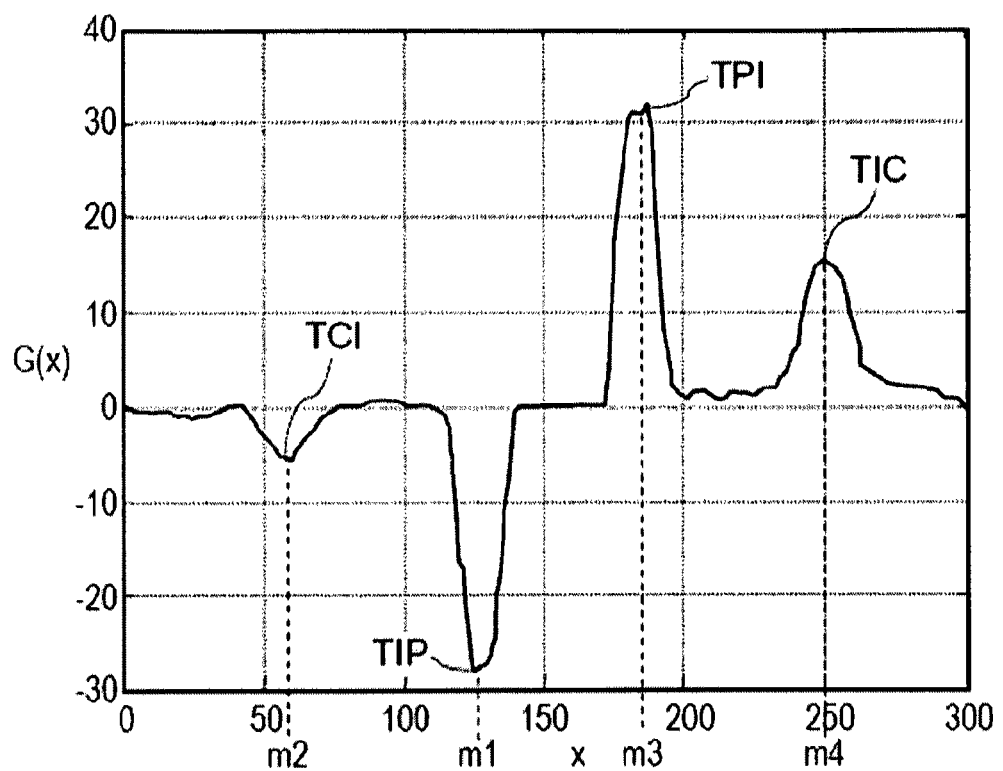
FIG. 8 represents a curve resulting from the application of a gradient filter to the curve in FIG. 6.

FIG. 8 represents an example of a variation curve of the gradient filter G(m) applied to the pixels of the axis (Cp,x). At the position m1 corresponding to the left transition between the iris and the pupil TIP, the curve of the gradient filter G(m) has a minimum value G(m1) (negative central peak). At the position m2 corresponding to the left transition between the cornea and the iris TCI, the curve has a second negative peak (other minimum local value) G(m2). At the right transition between the pupil and the iris TPI, located at the position m3, the curve G(m) has a maximum value G(m3) (positive central peak). At the right transition between the iris and the cornea TIC located at the position m4, a second positive peak G(m4) (other maximum local value) can be observed on the curve of the gradient filter G(m). Here again, the positions m2 and m4 on the axis (Cp,x) of the transitions between the iris and the cornea TCI, TIC are those which are respectively the furthest to the right and the furthest to the left out of the four positions m1-m4, or those which correspond to the two lowest peaks of the gradient filter in absolute value out of the four peaks observed G(m1), G(m2), G(m3), G(m4).

The approximate radius of the iris is then obtained using the following formula:

$$Ri1 = |\hat{x} - m4|, Ri2 = |\hat{x} - m2| \quad (11)$$

If Ri1≈Ri2 then
  If |G(m4)|>|G(m2)| then Ri=Ri1
  or otherwise Ri=Ri2
or otherwise
  If |G(m4)|<|G(m2)|, then Ri=Ri1
  or otherwise Ri=Ri2

In other words, the radius of the iris Ri is chosen equal to the distance in number of pixels between the position $\hat{x}$ of the center of the pupil on the axis (Cp,x) and the position m2 or m4 corresponding to the highest value in absolute value of the gradient filter G(m2), G(m4) of the transitions TCI, TIC if the distances Ri1 and Ri2 are similar. In the opposite case, the value of the radius Ri is calculated with the position m2 or m4 corresponding to the lowest peak of the gradient filter G(m2), G(m4) in absolute value.

In the same way as for the determination of the radius Rp of the pupil, the value of the radius Ri and the position of the center Ci of the iris can then be refined using the differential operator described above, applied to the preprocessed image. The center Ci($\hat{x}i$, $\hat{y}i$) of the iris can thus be obtained with a grid of 5×5 pixels centered on the center of the pupil Cp($\hat{x}$, $\hat{y}$), and the value of the radius of the iris is close to the value Ri previously calculated. The center Ci($\hat{x}i$, $\hat{y}i$) and the radius Ri of the iris can be refined using the following formula:

$$(Ri, \hat{x}i, \hat{y}i) = \max_{\substack{r \in [Ri-4, Ri+8] \\ x \in [\hat{x}-2, \hat{x}+2] \\ y \in [\hat{y}-2, \hat{y}+2]}} \left\{ \sum_{\theta=0}^{\theta=2\pi} \left( \frac{I(x + r\cos(\theta), y + r\sin(\theta))}{2\pi r} - \frac{I(x + (r-1)\cos(\theta), y + (r-1)\sin(\theta))}{2\pi(r-1)} \right) \right\} \quad (12)$$

The method proves to be quite insensitive to occlusions of the eye by an eyelid or the eyelashes, to the contrast between the iris and the cornea or between the cornea and the pupil, and to the presence of spurious light reflections on the eye. It can be implemented without requiring any significant calculation means, while offering a rate of good location nearing 100%. The method is therefore well-suited for low-cost iris recognition systems, i.e., having a relatively low-performance camera in terms of optics and image sensor (without any autofocus device, with a low depth of field, a low optical resolution, etc.), and low-capacity calculation means.

It will be understood by those skilled in the art that various alternative embodiments and applications are possible. In particular, embodiments are not limited to locating the external contour of the iris using a calculation of energy of high-frequency components or of a gradient filter. Other methods enabling intensity steps to be detected corresponding to the positions on the axis (Cp,x) of the transitions between the iris and the cornea can be considered by those skilled in the art. The detection can be performed on pixels along a straight or curved line, or even a line made up of straight line segments, passing through the pupil and transition zones between the iris and the cornea, on either side of the pupil. Therefore, it is not necessary for this line to be straight and to pass exactly through the estimated center of the pupil.

Furthermore, other methods for locating the contour of the pupil can be considered, while remaining within the framework of the present Disclosure. The same is true of the pre-processing method. The methods described herein can also be implemented without providing any prior preprocessing of the image in order to eliminate the eyelashes and the reflections or to enhance the contrast. The absence of all or part of such preprocessing may cause a decrease in the performance of the iris location.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for locating an iris in an image of an eye, comprising:
   locating a pupil in the image;
   detecting positions of intensity steps of pixels located on a line passing through the pupil and transition zones between the iris and a cornea, on either side of the pupil, wherein the positions of the transitions are detected by calculating an energy level of high-frequency components of a Fourier spectrum obtained by a fast Fourier transform on a gate-type mobile window, applied to intensities of pixels located on the line, and searching for positions at which the high-frequency energy is locally maximal;
   determining a center and a radius of a circle passing through the detected positions of the transitions;
   generating a signal indicative of a location of the iris in the image of the eye based on the determined center and radius of the circle; and
   outputting the generated signal to an iris recognition module, the locating, detecting, determining and generating being performed by one or more configured devices.

2. The method according to claim 1 wherein a radius of the iris is determined by calculating a distance between a position of a center of the pupil and a selected one of the positions on the line of first and second transitions between the cornea and the iris.

3. The method according to claim 1 wherein the energy E(m) of the high-frequency components is obtained using the following formula:

$$E(m) = \sum_{f \in DHF} \left| \sum_{x=1}^{\Delta x} I(x) \Pi_m(x) e^{-\frac{2\pi i f x}{\Delta x}} \right|^2$$

wherein I(x) represents an intensity of a pixel at a position x on the line, m represents a position of a center of the gate-type mobile window $\Pi_m(x)$, and DHF represents a field of the high-frequency components.

4. A method for locating an iris in an image of an eye, comprising:
   locating a pupil in the image;
   detecting positions of intensity steps of pixels located on a line passing through the pupil and transition zones between the iris and a cornea, on either side of the pupil, wherein the positions of the transitions are detected by applying a gradient filter between two successive gate-type mobile windows to intensities of pixels located on the line and searching for positions at which a value of the gradient filter locally has an extremum;
   determining a center and a radius of a circle passing through the detected positions of the transitions;

generating a signal indicative of a location of the iris in the image of the eye based on the determined center and radius of the circle; and outputting the generated signal to an iris recognition module, the locating detecting, determining and generating being performed by one or more configured devices.

5. The method according to claim 4 wherein a radius of the iris is determined by calculating a distance between a position of a center of the pupil and a selected one of the positions on the line of the first and second transitions between the cornea and the iris.

6. The method according to claim 4 wherein the gradient filter is calculated according to:

$$G(m) = \frac{1}{\Delta x} \sum_{x \in \Pi_m} I(x) - \frac{1}{\Delta x} \sum_{x \in \Pi_{m-1}} I(x)$$

wherein I(x) represents an intensity of a pixel at position x, m and m−1 represent a position of a center of the gate-type mobile windows $\Pi_m(x)$ and $\Pi_{m-1}(x)$, and $\Delta x$ represents a width of the mobile windows.

7. The method according to claim 1 wherein a width of the mobile windows ($\Pi_m(x)$) is equal to 16 pixels and a displacement pitch of the mobile windows is set at 4 pixels.

8. The method according to claim 4 wherein a width of the mobile windows ($\Pi_m(x)$) is equal to 16 pixels and a displacement pitch of the mobile windows is set at 4 pixels.

9. The method according to claim 1 wherein a position of the center of the circle and a value of the radius of the circle are refined by an integrodifferential operator.

10. The method according to claim 1 wherein the pupil is located by segmenting the image, to delimit a contour of the pupil, followed by an estimation of a center of the pupil by calculating the geometrical center of the contour of the pupil.

11. A method according to claim 10 wherein a radius of the pupil is obtained as follows:

$$Rp = \max(w, h)$$

where $$w = \left(\frac{4}{\pi}\right)^{1/4}\left(\frac{\phi_2^3}{\phi_1}\right)^{1/8} \text{ and } h = \left(\frac{4}{\pi}\right)^{1/4}\left(\frac{\phi_1^3}{\phi_2}\right)^{1/8}$$

$$\text{with } \phi_1 = \sum_{ROIP}(x-\hat{x})^2 \text{ and } \phi_2 = \sum_{ROIP}(y-\hat{y})^2$$

x, y being coordinates of pixels in a search zone ROIP, and $\hat{x}$, $\hat{y}$ being coordinates of the center of the pupil.

12. The method according to claim 11 wherein the radius of the pupil is refined by an integrodifferential operator.

13. The method according to claim 1, further comprising a preprocessing step of filtering intensities of pixels of the image to eliminate eyelashes on the cornea and the iris, and reflections on the pupil.

14. The method according to claim 13 wherein the filtering performed during the preprocessing step applies morphological closing and opening operations to the intensities of the pixels of the image.

15. The method according to claim 13 wherein the preprocessing step comprises applying a contrast enhancement process to the intensities of the pixels of the image.

16. The method according to claim 13 wherein contrast enhancement is performed only on a zone of the image in which the pupil is assumed to be.

17. A device to locate an iris in an image of an eye, configured for locating a pupil in the image, the device comprising:

means for detecting positions of intensity steps of pixels located on a line passing through the pupil and transition zones between the iris and a cornea, on either side of the pupil, configured to determine an energy level of high-frequency components of a Fourier spectrum obtained by a fast Fourier transform on a gate-type mobile window, applied to intensities of the pixels located on the line, wherein the positions of the transition zones are detected by searching for positions at which the high-frequency energy is locally maximal;

means for determining a center and radius of a circle passing through the detected positions of the transitions; and means for outputting a signal indicative of the determined center and radius.

18. The device according to claim 17 wherein the means for determining the center and radius is configured to determine the radius by calculating a distance between a position of a center of the pupil and one of the detected positions on the line of first and second transitions between the cornea and the iris, corresponding to a highest high-frequency energy.

19. The device according to claim 17 wherein the means for determining the center and radius is configured to determine the energy of the high-frequency components according to:

$$E(m) = \sum_{f \in DHF} \left| \sum_{x=1}^{\Delta x} I(x) \Pi_m(x) e^{\frac{-2\pi i f x}{\Delta x}} \right|^2$$

wherein I(x) represents an intensity of a pixel at a position x on the line, m represents a position of a center of the gate-type mobile window $\Pi_m(x)$, and DHF represents a field of the high-frequency components.

20. A device to locate an iris in an image of an eye, configured for locating a pupil in the image, the device comprising:

means for detecting positions of intensity steps of pixels located on a line passing through the pupil and transition zones between the iris and a cornea, on either side of the pupil, wherein the positions of the transitions are detected by applying a gradient filter between two successive gate-type mobile windows to the intensities of the pixels located on the line and searching for positions at which a value of the gradient filter locally has an extremum;

means for determining a center and radius of a circle passing through the detected positions of the transitions; and means for outputting a signal indicative of the determined center and radius.

21. The device according to claim 20 wherein the means for determining the center and the radius is configured to determine the radius by calculating a distance between a position of a center of the pupil on the line and one of the positions on the line of the first and second transitions between the cornea and the iris corresponding to a highest value of the gradient filter in absolute value.

22. The device according to claim 20 wherein the gradient filter is applied in the following manner:

$$G(m) = \frac{1}{\Delta x} \sum_{x \in \Pi_m} I(x) - \frac{1}{\Delta x} \sum_{x \in \Pi_{m-1}} I(x)$$

wherein I(x) represents the intensity of a pixel at the position x, m and m−1 represent a position of a center of the respective gate-type mobile windows $\Pi_m(x)$ and $\Pi_{m-1}(x)$, and $\Delta x$ represents a width of the mobile windows.

23. The device according to claim 17 wherein a width of the mobile windows is equal to 16 pixels and a displacement pitch of the mobile windows is set at 4 pixels.

24. The device according to claim 17, further comprising means for refining the position of the center and the radius of the iris by an integrodifferential operator.

25. The device according to claim 17, further comprising means for locating the pupil by segmenting the image to delimit a contour of the pupil, then estimating a center of the pupil by calculating a geometrical center of the contour of the pupil.

26. The device according to claim 25, further comprising means for calculating a radius of the pupil by the following expression:

$$Rp = \max(w, h)$$

where $$w = \left(\frac{4}{\pi}\right)^{1/4} \left(\frac{\phi_2^3}{\phi_1}\right)^{1/8} \text{ and } h = \left(\frac{4}{\pi}\right)^{1/4} \left(\frac{\phi_1^3}{\phi_2}\right)^{1/8}$$

with $\phi_1 = \sum_{ROIP} (x - \hat{x})^2$ and $\phi_2 = \sum_{ROIP} (y - \hat{y})^2$ x, y being coordinates of pixels in a search zone ROIP, and $\hat{x}$, $\hat{y}$ being coordinates of the center of the pupil.

27. The device according to claim 26, further comprising means for refining the radius of the pupil by an integrodifferential operator.

28. The device according to claim 17, further comprising means for preprocessing the image by filtering intensities of pixels of the image to eliminate eyelashes on the cornea and the iris, and reflections on the pupil.

29. The device according to claim 28 wherein the filtering is performed by applying morphological closing and opening operations to intensities of the pixels of the image.

30. The device according to claim 28 wherein the preprocessing of the image is performed by applying a contrast enhancement process to intensities of the pixels of the image.

31. The device according to claim 30, further comprising means for enhancing a contrast of the image only in a zone of the image in which the pupil is assumed to be.

32. A system to process a digital image of an eye, the system comprising:
one or more processing devices configured to implement:
a pupil location module configured to locate a pupil in the digital image; and
an iris location module configured to locate in the digital image transitions between an iris and a cornea based on intensities of pixels on a curve passing through a center of the pupil, wherein the iris location module is configured to determine positions of the transitions based on energy levels of high-frequency components of a Fourier spectrum obtained by a fast Fourier transform on a gate-type mobile window, applied to intensities of pixels located on the curve, and searching for positions at which the high-frequency energy is locally maximal.

33. The system of claim 32 wherein the curve is a straight line passing through the center of the pupil.

34. The system of claim 32 wherein the iris location module is configured to determine a radius of the iris based on a distance between a position of a center of the pupil and a selected one of the positions on the curve of first and second transitions between the cornea and the iris.

35. A system to process a digital image of an eye, the system comprising:
one or more processing devices configured to implement:
a pupil location module configured to locate a pupil in the digital image; and
an iris location module configured to locate in the digital image transitions between an iris and a cornea based on intensities of pixels on a curve passing through a center of the pupil, wherein the iris location module is configured to apply a gradient filter between two successive gate-type mobile windows to intensities of pixels located on the curve, and to search for positions at which a value of the gradient filter locally has an extremum.

36. The system of claim 35, further comprising a preprocessing module configured to filter intensities of pixels of the image to eliminate eyelashes on the cornea and the iris, and reflections on the pupil.

* * * * *